No. 637,782. Patented Nov. 28, 1899.
J. S. HEMENWAY.
INFLATING VALVE.
(Application filed Aug. 23, 1898.)

(No Model.)

Witnesses
Justin S. Hemenway, Inventor.
By his Attorneys,

UNITED STATES PATENT OFFICE.

JUSTIN SAMUEL HEMENWAY, OF RIVER FALLS, WISCONSIN.

INFLATING-VALVE.

SPECIFICATION forming part of Letters Patent No. 637,782, dated November 28, 1899.

Application filed August 23, 1898. Serial No. 689,329. (No model.)

*To all whom it may concern:*

Be it known that I, JUSTIN SAMUEL HEMENWAY, a citizen of the United States, residing at River Falls, in the county of Pierce and State of Wisconsin, have invented a new and useful Inflating-Valve, of which the following is a specification.

My invention relates to improvements in inflating-valves especially adapted for pneumatic tires; and the object that I have in view is to provide an improved construction in which the active parts of the valve are made of metal to obviate decay of the parts and reduce to a minimum the liability of leakage of air, due to defects in the packing ordinarily employed in valves of this character.

A further object of the invention is to provide an improved construction which renders it unnecessary to make a large opening in the wheel rim or felly for the accommodation of the valve-stem, thus retaining to an appreciable extent the initial strength of the rim.

A further object of the invention is to provide an improved construction in which the active elements of the valve are easily accessible for the detachment of said valve quickly from the stem, so that in case of leakage to such an extent as to necessitate repairs or renewal of some of the operative parts the entire valve may be detached without removing the stem from the tire or the tire from the wheel.

With these ends in view the invention consists in the novel combination of elements and in the construction, arrangement, and adaptation of parts, as will be hereinafter fully described and claimed.

To enable others to understand the invention, I have illustrated a preferred embodiment thereof in the accompanying drawings, forming a part of this specification, and in which—

Figure 1:
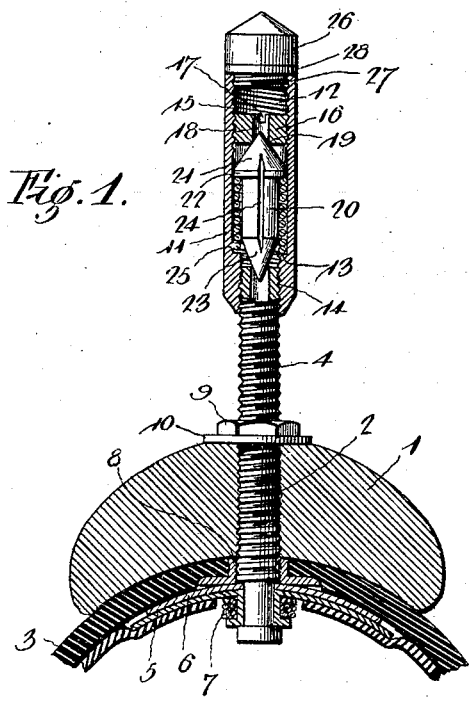
Figure 2:
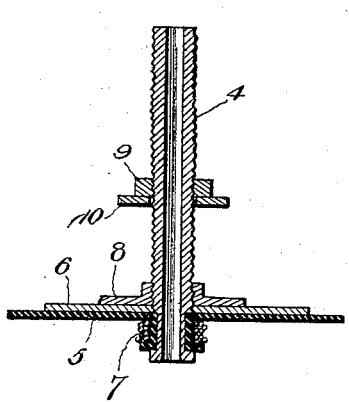
Figures 3, 5:
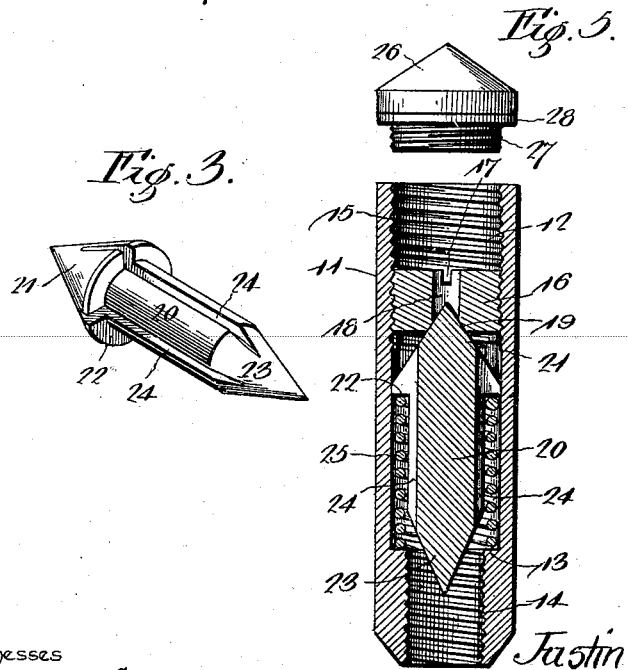
Figure 4:
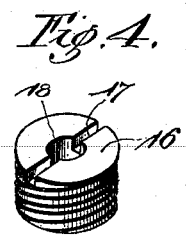

Figure 1 is a vertical sectional elevation through a rim and tire, illustrating my improved valve applied thereto. Fig. 2 is a detail sectional view of the stem with the valve detached. Fig. 3 is a detail view of the valve-plunger. Fig. 4 is a like view of the bearing-plug. Fig. 5 is an enlarged sectional view of the valve with the parts thereof assembled in operative relation and with the valve-shell detached from the stem.

Like numerals of reference denote like and corresponding parts in each of the several figures of the drawings.

1 designates the rim or felly of an ordinary bicycle-wheel, which is provided with a transverse hole 2, and 3 is an ordinary tire, which is seated on and attached to the rim in any preferred way. These parts are all ordinary in the art, and hence no novelty therefor is herein claimed; but in passing I desire to remark that according to my invention the hole 2 in the rim is of very small diameter for the accommodation of a valve-stem. Hence the strength of the rim or felly is preserved.

I employ a tubular stem 4 of small diameter, which is arranged to pass through the hole 2 in the felly, and on the inner end of this stem is fitted a disk 5, by which the stem may be fastened to the tire, so as to communicate with the air space or chamber therein. This attaching-disk 5 is preferably of rubber, reinforced on one face thereof by a fabric disk 6, and the exposed face of this attaching rubber disk 5 may be united by any suitable rubber cement in an air-tight manner to the tire, so as to prevent leakage of air. The disk 5 and the tubular stem 4 are held together by a thread or wire 7, which is twisted or coiled around an inturned edge 7ª at the middle part of the disk 5 in such a way as to form an air-tight connection between the central part of the disk 5 and the stem 4. (See Figs. 1 and 2.)

The tubular stem 4 is of uniform diameter throughout its length, and it is externally screw-threaded. This stem passes through the hole 2 of the rim or felly to project beyond the inner face of the latter for a suitable distance to receive the valve shell or tube, and said stem is held firmly on the rim by the bearing-plate 8 and the nut 9. This bearing-plate has a threaded opening, by which it may be screwed on the stem, so as to press against the disks 5 6 and rest against one face of the wheel rim or felly. The nut 9 is screwed on the threaded stem to bear against the opposite face of the rim or felly, and a washer 10 is interposed between the nut and the felly, all as clearly shown by Fig. 1.

The valve in my invention is made separate from the stem 4, so that it may be readily detached therefrom when its parts become worn to such an extent as to require repairs or renewal of any of the parts. A further peculiarity of my valve is that all of its parts are made of metal, thus reducing the wear to a minimum and obviating the employment of gaskets, which are liable to decay and cause leakage of the valve. The valve has a shell or casing 11 in the form of an elongated tube of small diameter, and within this shell is a longitudinal passage 12, which at the lower part of the shell is contracted in diameter to produce an annular shoulder or ledge 13 between the large and small sections of the passage 12. The contracted part of the passage at the lower end of the valve-shell is internally screw-threaded, as at 14, to enable said shell to be screwed detachably to the upper end of the tubular stem 4. The enlarged part of the passage 12 in the valve-shell is internally threaded, as at 15, thus leaving a plain smooth surface within the valve-shell between the threaded length 15 thereof and the annular shoulder 13, said smooth length of the passage within the valve-shell accommodating the valve-plunger presently described.

Within the threaded part 15 of the valve-shell is screwed an externally-threaded bearing-plug 16, which is provided in one of its faces with a transverse notch 17, adapted for the reception of one end of a screw-driver or other implement by which the plug may be adjusted, as required, within the valve-shell. This bearing-plug is designed to lie wholly within the shell and to occupy a stationary or fixed position therein with relation to the valve-plunger, and to provide for the passage of air through this fixed plug an axial passage 18 is formed in said plug, one end of which passage terminates in a conical recess 19, adapted to form a seat for one end of the valve-plunger.

The valve-plunger is a single piece of metal cylindrical in form and of a length proper to have a limited reciprocating movement or play between the upper extremity of the stem 4 and the seat 19 of the bearing-plug 16; but the valve-shell may be screwed on the stem 4 to cause one end of the plunger to fit snugly to the opening in the tubular stem 4 and its other end to fit in like manner upon the seat 19 of the plug 16, whereby both ends of the plunger may be seated firmly against the stem and plug to tightly close the air-passage through the valve-casing. At one end this plunger 20 is enlarged to produce a conical head 21, which is of greater diameter than the shank or stem of the plunger, thereby forming an annular shoulder 22 between the head and the stem. The opposite end of the stem or shank of the plunger is of conical form, as at 23, and said conical end 23 is presented to the upper end of the stem 4, while the conical head 21 is presented to the seat 19 in the plug 16. This plunger 20 is formed with a series of longitudinal grooves or channels 24, which open through the enlarged head 21, and said plunger is normally lifted or forced toward the plug 16 by a coiled spring 25, which is fitted loosely around the stem of the plunger, so as to have one end thereof bear against the shoulder 22, and its other end rests upon the shoulder 13 of the valve-shell.

The outer end of the valve-shell is closed by a cap 26, which is formed with a threaded tenon 27, adapted to be screwed into the threaded part 15 of the shell, and this cap is equipped with a gasket or packing 28, which is interposed between the shoulder of the cap and the end of the shell 11, thus forming a tight joint between the cap and shell.

From the foregoing description it will be seen that I have provided an improved construction of valve in which the parts are all contained within a shell that is attached to a stem and lies within the wheel-rim, said valve being entirely independent of the rim. The valve is readily accessible, so that it may be unscrewed from the stem for inspection, repairs, or renewal of any of its parts, and the valve is thus capable of removal without detaching the stem from the tire or removing the latter from the rim. To deflate the tire, it is only necessary to unscrew the valve-shell from the stem, thus providing a free vent or opening for the escape of air. To inflate the tire, the cap 26 is removed from the valve-shell, and the shell itself is turned a few times on the stem, so as to adjust the conical end 23 of the valve-plunger away from the end of the stem 4. An inflating-pump may readily be connected to the shell 11, and the inflowing current of air displaces the valve-plunger away from the plug 16, thus allowing the air to pass readily through the shell and stem into the tire. The plunger serves as a check-valve during the operation of inflating the tire, and to tightly close the valve subsequent to the inflation of said tire the shell is rotated on the stem until the conical end 23 of the plunger and the conical head 21 of said plunger are fitted tightly in the stem 4 and plug 6. This adjustment of the shell provides two points of bearing for the metallic valve against the stem and the plug, and the plunger is thus adapted to tightly close the valve against the leakage of air. Dust is prevented from entering the shell by the attachment of the cap to the threaded part 15 of said shell.

I have found by experiment that good results are obtained by the employment of a stem which does not exceed three-sixteenths of an inch in diameter. The use of such a small stem is advantageous, because it is not necessary in my invention to provide a large hole in the rim for the accommodation of the valve.

As shown by Fig. 1 of the drawings, my improved valve is adapted for application to a double-tube tire, in which the attaching means are of special utility, as they provide a secure air-tight connection between the valve and the tire; but I do not restrict the valve to double-tube tires, as the gist of the invention may be availed of by attaching the stem to a single-tube tire in a suitable way.

Changes may be made in the form of some of the parts while their essential features are retained and the spirit of the invention embodied. Hence I do not desire to be limited to the precise form of all the parts as shown, reserving the right to vary therefrom.

Having thus described the invention, what I claim is—

1. A valve comprising members which are respectively fixed and adjustable and provided with seats on their opposing faces, a shouldered valve-plug provided with air-ducts and slidably confined in one of said members, and a pressure-spring actively fitted to the shouldered valve-plug, substantially as described.

2. A valve comprising members which are relatively fixed and movable, one of said members being threaded and provided with a spring-seat, a plug adjustable in the threaded member, a valve-plug having bearing-faces at its respective ends, and a spring fitted on the seat of the valve member and acting against the valve-plug, substantially as described.

3. A valve comprising members which are relatively fixed and adjustable, one member having a spring-seat, a plug adjustable in the other valve member and having a duct and a valve-seat, a double-faced valve-plug adapted to the seats of the valve member and the first-named plug, and a spring seated in the adjustable valve member and acting against the valve-plug, substantially as described.

4. In an inflating-valve, a valve-plunger having the oppositely-facing ends, a shoulder within one end face, and channels which open through the shoulder and the face at one end of said plunger, combined with a stem having a seat for one end of the valve-plunger, a shell adjustable on the stem and provided with a seat for the other end of the valve-plunger, and a spring seated in the shell and against the shoulder of the plunger, substantially as described.

5. In an inflating-valve, the combination with a stem, of a shell screwed to the stem and provided with an internal shoulder or ledge, an apertured plug screwed within the shell, a double-ended plunger confined within the shell between the stem and the plug, and a spring seated on the ledge of the shell and acting against the plunger, substantially as described.

6. In an inflating-valve, the combination with a stem, of a shell screwed to said stem, an apertured plug screwed within the shell, a plunger having the conical ends and the longitudinal channels and confined within the shell between the stem and the plug, and a spring seated against the plunger and the shell, for the purpose described, substantially as set forth.

In testimony that I claim the foregoing as my own I have hereunto affixed my signature in the presence of two witnesses.

JUSTIN SAMUEL HEMENWAY.

Witnesses:
F. H. BARNEY,
H. E. BLAISDELL.